US006768284B2

United States Patent
Lee et al.

(10) Patent No.: US 6,768,284 B2
(45) Date of Patent: Jul. 27, 2004

(54) METHOD AND COMPENSATION MODULATOR FOR DYNAMICALLY CONTROLLING INDUCTION MACHINE REGENERATING ENERGY FLOW AND DIRECT CURRENT BUS VOLTAGE FOR AN ADJUSTABLE FREQUENCY DRIVE SYSTEM

(75) Inventors: Kevin Lee, Menomonee Falls, WI (US); Scott K. Becker, Greenfield, WI (US); Kevin J. Schmidt, Waukesha, WI (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 10/260,917

(22) Filed: Sep. 30, 2002

(65) Prior Publication Data

US 2004/0062062 A1 Apr. 1, 2004

(51) Int. Cl.[7] .................................................. H02D 5/40
(52) U.S. Cl. ...................................... 318/808; 318/808
(58) Field of Search ................................. 318/268, 805, 318/807, 808, 809, 269, 99, 801, 802, 803, 810; 363/37.39, 41, 127, 132, 98, 37, 40

(56) References Cited

U.S. PATENT DOCUMENTS

| 4,967,135 A | * | 10/1990 | Ashikaga et al. ............ 318/808 |
| 5,212,438 A | * | 5/1993 | Miyazaki et al. ............ 318/805 |
| 6,198,240 B1 | * | 3/2001 | Notohara et al. ............ 318/268 |

* cited by examiner

*Primary Examiner*—Rajnikant B Patel
(74) *Attorney, Agent, or Firm*—John A. Kastelic (57) ABSTRACT

A method for dynamically controlling regenerating energy flow and direct current bus voltage for an adjustable frequency drive system includes sensing a direct current voltage of a direct current bus; and sensing a plurality of alternating currents at outputs of an inverter. The sensed alternating currents are transformed to a stationary current vector. Voltage and frequency values are converted to a stationary voltage vector and an angle. The angle and the stationary current vector are transformed to a rotating current vector including torque and flux producing current components. An induction machine generating mode is determined when the torque producing current component reverses polarity. The voltage and frequency values limit the direct current voltage of the direct current bus at a predetermined threshold responsive to the generating mode. The stationary voltage vector and the angle are converted to pulse width modulated control inputs of the inverter.

12 Claims, 11 Drawing Sheets

METHOD AND COMPENSATION MODULATOR FOR DYNAMICALLY CONTROLLING INDUCTION MACHINE REGENERATING ENERGY FLOW AND DIRECT CURRENT BUS VOLTAGE FOR AN ADJUSTABLE FREQUENCY DRIVE SYSTEM

BACKGROUND OF THE INVENTION

1. Field of the Invention

The invention relates to adjustable frequency drive (AFD) systems and, in particular, to such AFD systems, which control the speed, torque, horsepower and/or direction of an induction machine, such as an AC motor.

2. Background Information

An Adjustable Frequency Drive (AFD) system may be employed in a wide range of commercial applications, such as, for example, HVAC, fans, pumps, conveyors, material handling and processing equipment, and other general industries, such as, for example, forest products, mining, metals and printing.

If the stator terminals of an induction machine are connected to a three-phase AFD system, then the rotor will rotate in the direction of the stator rotating magnetic field. This is the induction machine motoring mode of operation. When load torque is applied to the motor shaft, the steady state speed is less than the synchronous speed.

When the induction machine speed is higher than the synchronous speed, and the induction machine rotates in the same direction as the stator rotating field, then the induction machine is in the generating mode of operation. A generating torque acting opposite to the stator rotating magnetic field is produced. For example, to stop an AFD system, the power supply frequency is gradually reduced. In the deceleration process, the instantaneous speed of the AFD system is higher than the instantaneous synchronous speed because of the system inertia. As a result, the generating action of the induction machine will cause the power flow to reverse and the kinetic energy of the AFD system is fed back to the power supply source.

For AFD systems, the braking or regenerative energy of the system flows, for example, from the motor, through diodes in the inverter section of the drive, and into DC bus capacitors. Typically, the input diodes of the upstream converter do not provide a path for this energy to be returned to the AC power line. Hence, the regenerative current flows into the DC bus capacitance and, thus, the DC bus voltage increases.

There are four common methods to deal with the high DC bus voltage due to the regenerating condition. The first method employs silicon controlled rectifiers (SCRs), insulated gate bipolar transistors (IGBTs) or gate controlled thyristors (GCTs or GTOs), as converters in order to both provide power to the DC bus when motoring and to regenerate from the DC bus back to the AC line when braking. This method has the disadvantage of relatively higher cost since the converter section is similar to or the same as the inverter section.

The second method simply initiates a drive fault and trip when the DC bus voltage becomes too high. The disadvantage of this solution is the disruption of the process because of a resulting shut down or nuisance trip.

The third method handles the regenerating energy without tripping by employing a braking resistor, which provides a path to dissipate the regenerative energy. A braking resistor control circuit senses the high voltage condition and, then, electrically connects the braking resistors across the DC bus. The braking resistors (e.g., bus clamps; snubbers; voltage limiters) dissipate the excess energy. For example, for 230 VAC drives, the DC bus is approximately 310 VDC, and for 460 VAC drives, the DC bus is approximately 620 VDC. The actual DC bus voltage is about 1.35 times the RMS AC line voltage. The current through the braking resistor is proportional to the DC bus voltage divided by its resistance. For example, a 20 Ω resistor module connected across a 460 VAC line dissipates about 10 kW, while the same resistor dissipates about 20 kW when electrically connected to a DC bus, which is produced by rectifying a 3-phase AC line for a 460 VAC drive. The costs of the braking resistor can be significant, while the physical size of the resulting drive assembly increases. Both of these are normally undesirable results.

The fourth method actively limits the DC bus voltage at a safe threshold by applying proper control algorithms in response to regenerating conditions. However, when the induction machine operates in its normal motoring mode, the high input (utility) AC line voltages can push the DC bus voltage to reach the regenerating voltage threshold. In order to prevent the control algorithms from limiting the DC bus voltage in this scenario, it is known to employ input AC potential transformers or other voltage amplifier apparatus to measure the AC line input voltages. This approach similarly has the disadvantages of relatively higher cost and relatively larger physical dimensions.

The known solutions to handle AFD regenerating conditions have the disadvantages of shutting down industrial processes, relatively higher equipment costs and/or relatively larger physical sizes.

The generating mode of an AFD system causes the DC bus voltage to rise. The AC line input voltages to the system can be higher than the rated value in steady state. Also, momentary surges can occur in such voltages of any electrical distribution system, thereby causing a relatively higher DC bus voltage to be present in these cases. Therefore, it is difficult to determine which source is creating the energy that results in an over-voltage condition on the DC bus.

There is room for improvement in AFD systems and methods and apparatus for controlling the same.

SUMMARY OF THE INVENTION

These needs and others are met by the present invention, which identifies and controls regenerating energy flow for Adjustable Frequency Drives (AFDs). This regenerating energy flow is developed in both steady state and dynamic operating conditions of a three-phase induction machine, which is controlled by the AFD. The method and apparatus distinguish the energy source both in steady state and in dynamic transient conditions.

The three-phase currents of the AFD are converted into a stationary vector of current. The three-phase AC currents are measured by employing suitable current sensors (e.g., Hall effect) and are transformed into two-phase AC currents through the Clarke Transformation in the stationary reference frame. A space vector technique is employed to develop an angle. The Park Transformation employs the two-phase AC currents and the angle to produce two-phase DC current vectors in the rotating reference frame. These DC current vectors include the induction machine torque and flux producing components.

If the torque producing current vector reverses its polarity (e.g., direction; sign) when the commanded speed is less than the actual rotor speed, then the regenerating condition is confirmed.

If the regenerating condition is true, then a control algorithm turns on to limit the rising DC bus voltage at its predetermined threshold. When the induction machine is in the regenerating mode, the DC bus voltage is clamped at the predetermined threshold without tripping. The DC bus voltage is regulated dynamically by a compensation module, in order to stay at the predetermined threshold, thereby controlling the regenerating energy flow without necessarily tripping the AFD or adding costs and sizes to the overall electrical system. After the regenerating energy is dissipated and the induction machine is no longer in the generating mode, the DC bus voltage is automatically reset to the normal level in the motoring mode.

If the regenerating condition is not true, then the predetermined threshold adjusts itself based on the DC bus voltage level as determined by the AC line inputs.

The present invention provides a stable operating system and eliminates the disadvantages of the known prior art. In addition, the torque and flux producing current vectors in the rotating reference frame may be employed to conveniently calculate the induction machine power factor.

As one aspect of the invention, a method for dynamically controlling induction machine regenerating energy flow and direct current bus voltage for an adjustable frequency drive system comprises: sensing a direct current voltage of a direct current bus; sensing a plurality of alternating currents at alternating current outputs of an inverter; transforming the sensed alternating currents to a stationary current vector; converting a voltage value and a frequency value to a stationary voltage vector and an angle; transforming the angle and the stationary current vector to a rotating current vector including a torque producing current component and a flux producing current component; determining a generating mode of the induction machine when the torque producing current component reverses polarity; employing the voltage value and the frequency value to limit the direct current voltage of the direct current bus at a predetermined threshold responsive to the generating mode of the induction machine; and converting the stationary voltage vector and the angle to pulse width modulated control signals for the control inputs of the inverter.

As another aspect of the invention, an adjustable frequency drive for an induction machine comprises: a converter including a plurality of alternating current inputs and a direct current output having a first node and a second node; a capacitor electrically connected between the first and second nodes of the direct current output; an inverter including a direct current input, a plurality of switches, a plurality of control inputs, and a plurality of alternating current outputs, the direct current input electrically connected to the direct current output, the alternating current outputs adapted to electrically connect to alternating current inputs of the induction machine; each of the switches electrically connected between one of the first and second nodes and one of the alternating current outputs of the inverter, each of the control inputs controlling one of the switches; a voltage sensor sensing a direct current voltage at the direct current output of the converter and outputting a sensed voltage value; a plurality of current sensors sensing a plurality of alternating currents at the alternating current outputs of the inverter and outputting a plurality of sensed current values; and a processor comprising: a plurality of inputs for the sensed current values and the sensed voltage value, a plurality of outputs for the control inputs of the inverter, a Clarke Transform module transforming the sensed current values to a stationary current vector, a space vector module including a plurality of inputs and a plurality of outputs, the inputs of the space vector module comprising a set voltage value, a set frequency value, a change voltage value, and a change frequency value, the outputs of the space vector module comprising a stationary voltage vector and an angle, a pulse width modulation module including a plurality of inputs and a plurality of outputs, the inputs of the pulse width modulation module comprising the stationary voltage vector and the angle, the outputs of the pulse width modulation module providing the control inputs of the inverter, a Park Transform module transforming the angle and the stationary current vector to a rotating current vector, and a regeneration override module comprising a plurality of inputs and a plurality of outputs, the inputs of the regeneration override module comprising the sensed voltage value and the rotating current vector, the outputs of the regeneration override module comprising the change voltage value and the change frequency value, the regeneration override module dynamically controlling regenerating energy flow from the induction machine to the direct current output of the converter.

As another aspect of the invention, an adjustable frequency drive system comprises: a three-phase induction machine; and the adjustable frequency drive.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

Figure 1:
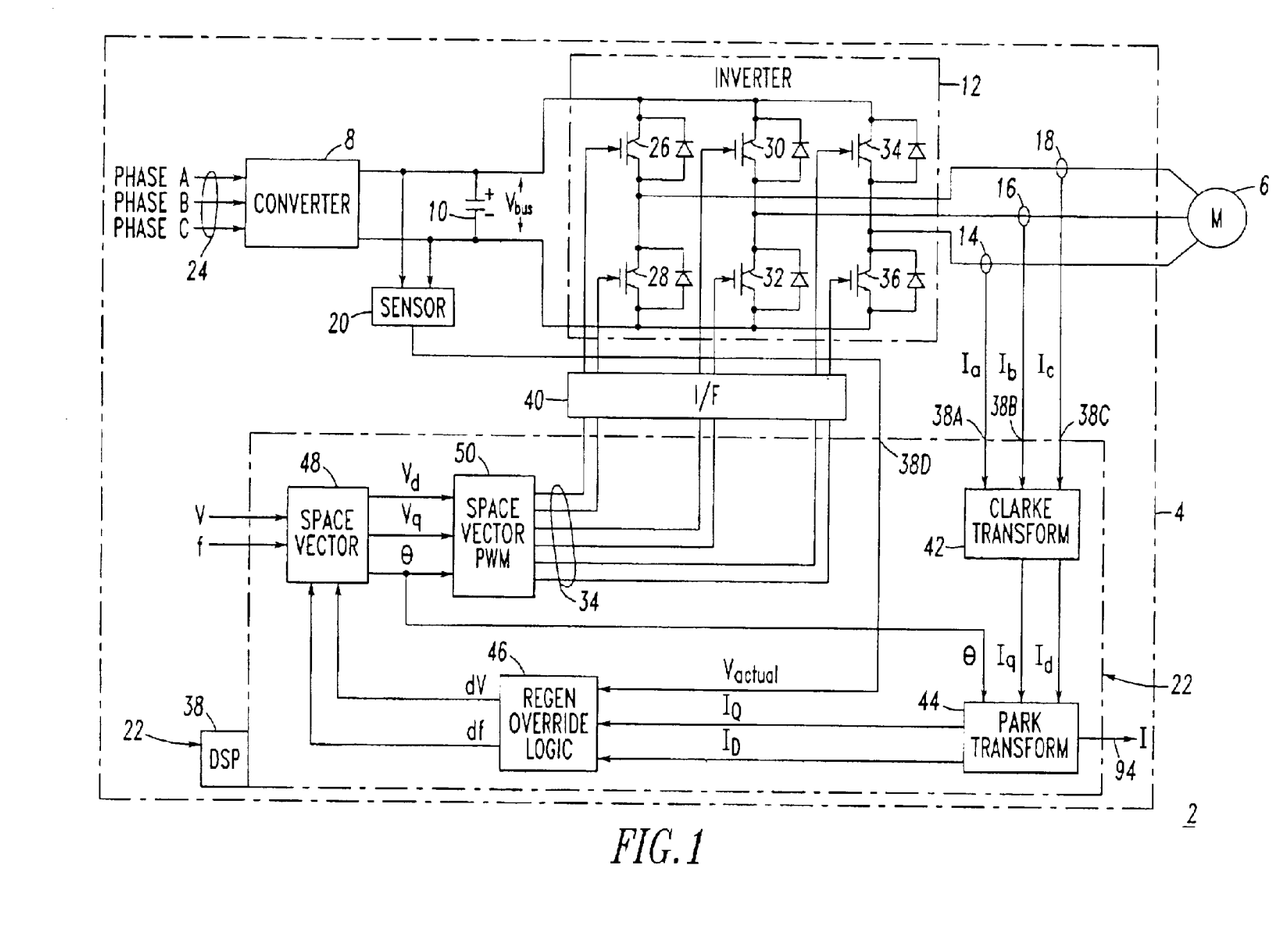
FIG. 1 is a block diagram of an AFD system for an induction machine in accordance with the present invention.

FIG. 1 shows a three-phase Adjustable Frequency Drive (AFD) system 2 including an AFD 4 and an induction machine, such as AC motor (M) 6. The AFD 4 includes a suitable converter, such as a full-wave rectifier bridge 8, a DC bus capacitor bank 10, an inverter 12, three current sensors 14,16,18, a DC bus voltage sensor 20, and a control system 22 including a processor and a plurality of control algorithms. The rectifier bridge 8 converts three-phase AC voltages 24 (from AC phases A,B,C) to an intermediate constant DC bus voltage, $V_{bus}$. Preferably, the rectifier bridge 8 effectively blocks most troublesome harmonics from reaching the AC power source (not shown). Since the rectifier bridge 8 employs diodes (not shown) and, thus, has no firing delays, the AFD system 2 may have a nearly constant power factor.

The DC bus capacitor bank 10 includes one or more energy storing capacitors (only one capacitor is shown), which help to keep the DC bus voltage, $V_{bus}$, constant. Preferably, the DC bus capacitor bank 10 is able to ride through power system transients and is capable of keeping active the circuits of the control system 22.

The inverter 12 inverts the DC bus voltage to an adjustable frequency, adjustable voltage AC output for the AC motor 6. For example, during each cycle of the fundamental excitation frequency, the insulated gate bipolar transistors (IGBTs) 26,28,30,32,34,36 of the inverter 12 are switched on and off at up to about 20 kHz, in order to create a variable voltage output for the AC motor 6. The benefits of relatively higher IGBT switching frequencies are lower motor noise, more sinusoidal current waveforms resulting in less motor harmonic heating, and higher control accuracy. The disadvantages of relatively higher IGBT switching frequencies include lower efficiencies and the possibility of peak voltage damage to the motor insulation.

The current sensors (e.g., Hall effect) 14,16,18 are placed on the AC outputs of the AFD 4 in order to measure the three-phase AC motor currents. Preferably, the DC bus voltage sensor 20 employs a suitably low cost circuit in order to produce a suitable analog, $V_{actual}$, of the DC bus voltage, $V_{bus}$.

The control system 22 preferably includes a suitable processor, such as digital signal processor (DSP) 38, which implements the control algorithms for controlling the motoring or regenerating energy flow. The DSP 38 includes four analog inputs 38A–38D corresponding to four DSP A/Ds (not shown) for the three current signals, $I_a, I_b, I_c$, and the one voltage signal, $V_{actual}$. The DSP 38 also includes a plurality of digital outputs 39 for the control inputs of the inverter 12. A suitable interface (I/F) 40 buffers six gate control signals from the digital outputs 39 to the IGBTs of the inverter 12. The control system 22 further includes a Clarke Transform module 42, a Park Transform module 44, a regeneration override logic module 46, a space vector module 48, and a space vector PWM module 50, which are executed by the DSP 38. The space vector PWM module 50 outputs (e.g., through the DSP outputs 39) the six gate control signals to the interface 40.

Figure 2:
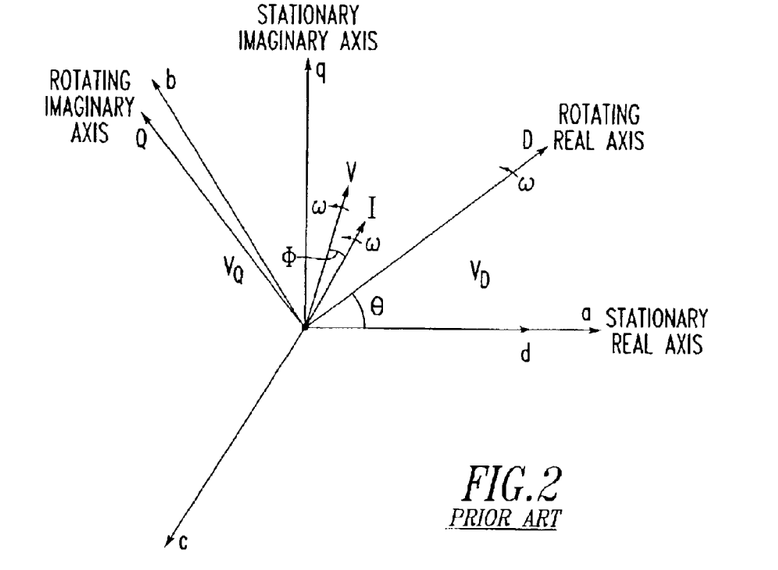
FIG. 2 is a vector diagram defining a motoring mode reference frame.
Figure 3:
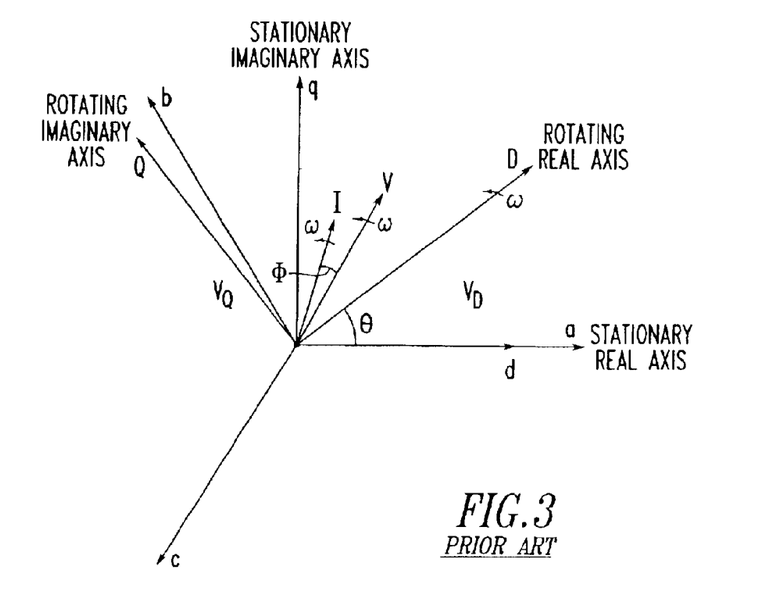
FIG. 3 is a vector diagram defining a generating mode reference frame.

As shown in FIGS. 2 and 3, the measured three-phase currents $I_a, I_b, I_c$ from the sensors 14,16,18, respectively, at the outputs of the inverter 12 of FIG. 1 are described in a stationary reference frame, wherein stationary real axes a,b,c are separated by 120 degrees. A stationary complex reference frame d,q includes a real axis d and an imaginary axis q. The complex real axis d is fixed to the stationary real axis a, which is the magnetic axis of the stator winding (not shown) of the AC motor 6. Both the stator current, I, and the stator voltage, V, are complex space vectors, which rotate about these axes at the rate of the excitation angular velocity, ω, produced by the AFD 4.

Figure 6:
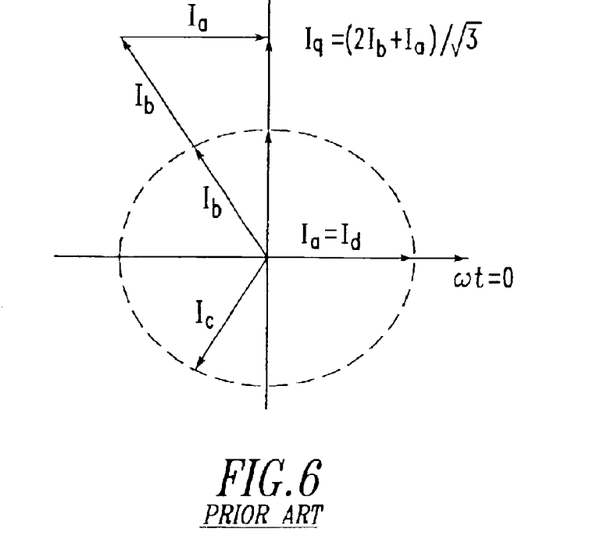
FIG. 6 is a vector diagram of the Clarke Transform.
Figure 7:
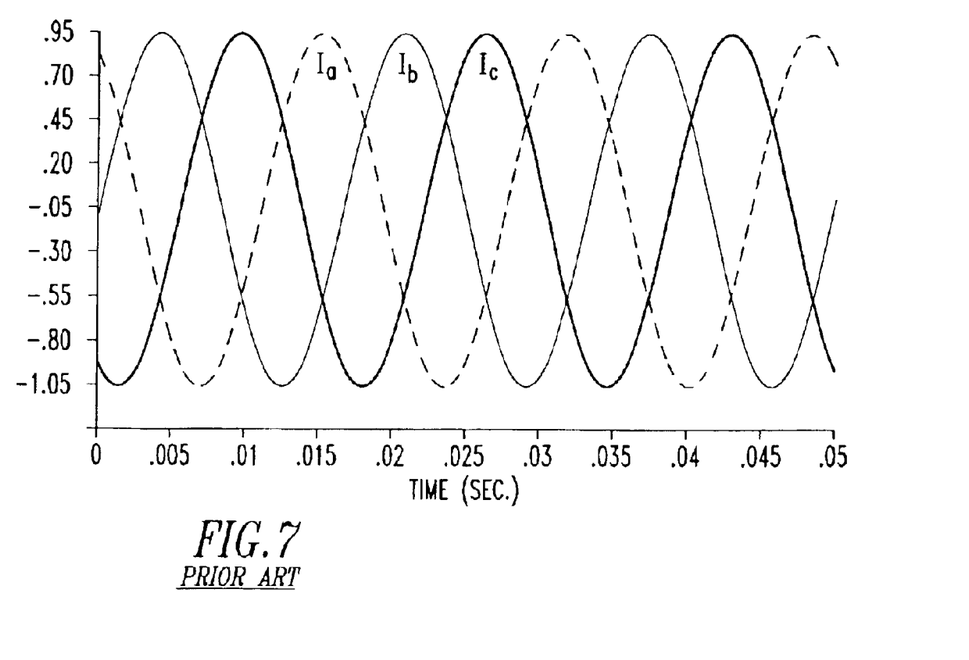
FIG. 7 is a plot of the three Clarke Transform input current signals versus time.
Figure 8:
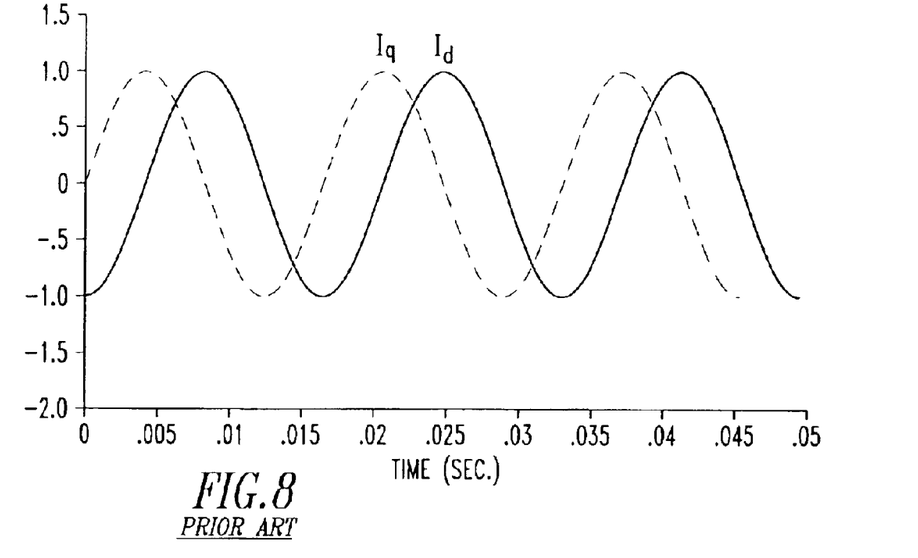
FIG. 8 is a plot of the two Clarke Transform output current signals versus time.

As shown in FIGS. 6–8, the three-phase currents $I_a, I_b, I_c$ in the axes a,b,c, respectively, are transformed into two-phase quantities $I_d, I_q$ in the axes d,q, respectively, using the Clarke Transform module 42 of FIG. 1, which employs the Clarke Transform Equation (Equation 1).

$$\begin{cases} I_d = I_a \\ I_q = (2I_b + I_a)/\sqrt{3} \end{cases} \quad \text{(Eq. 1)}$$

Figure 9:
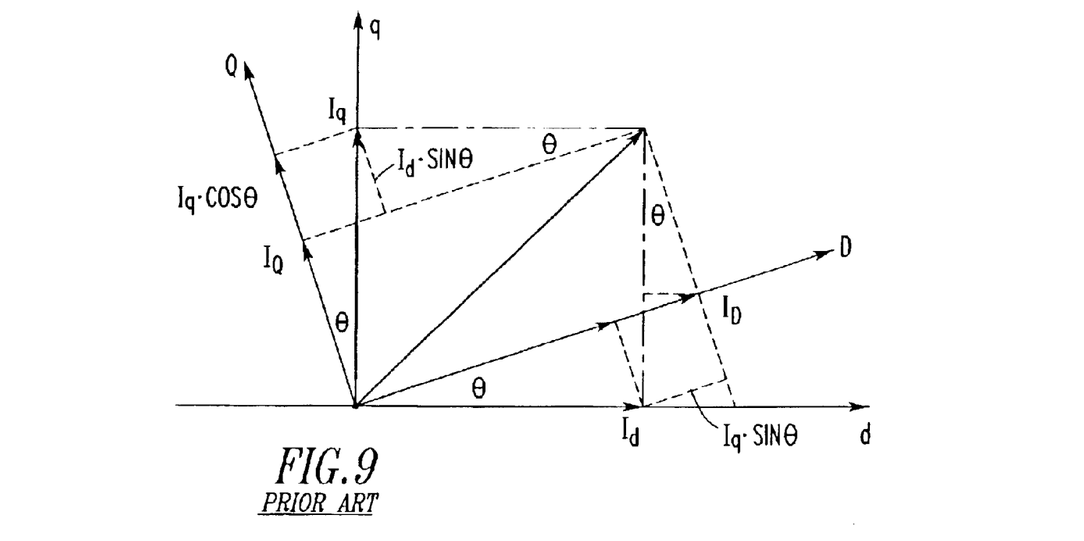
FIG. 9 is a vector diagram of the Park Transform.
Figure 10:
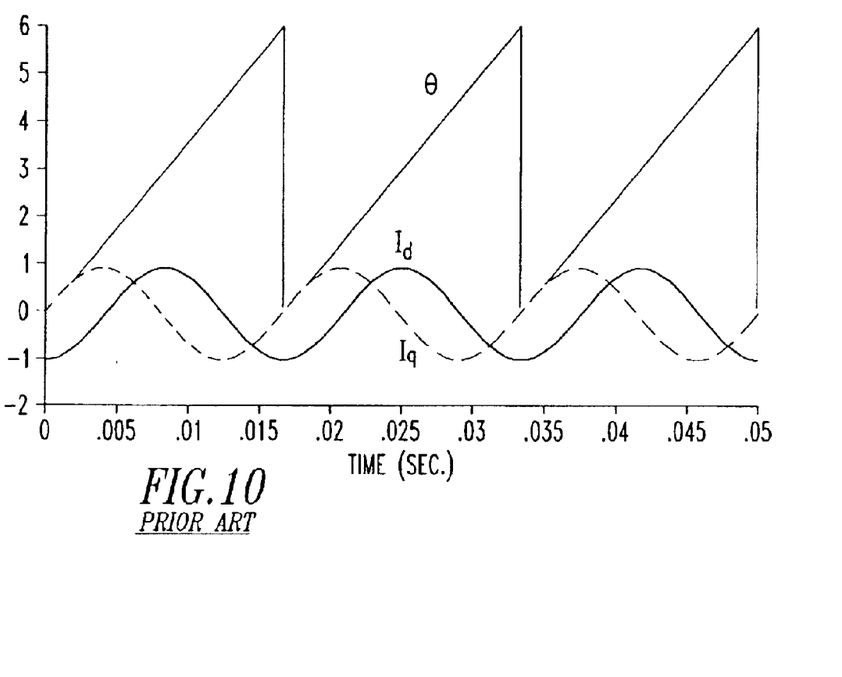
FIG. 10 is a plot of the two Park Transform input current signals and the Park Transform input angle versus time.
Figure 11:
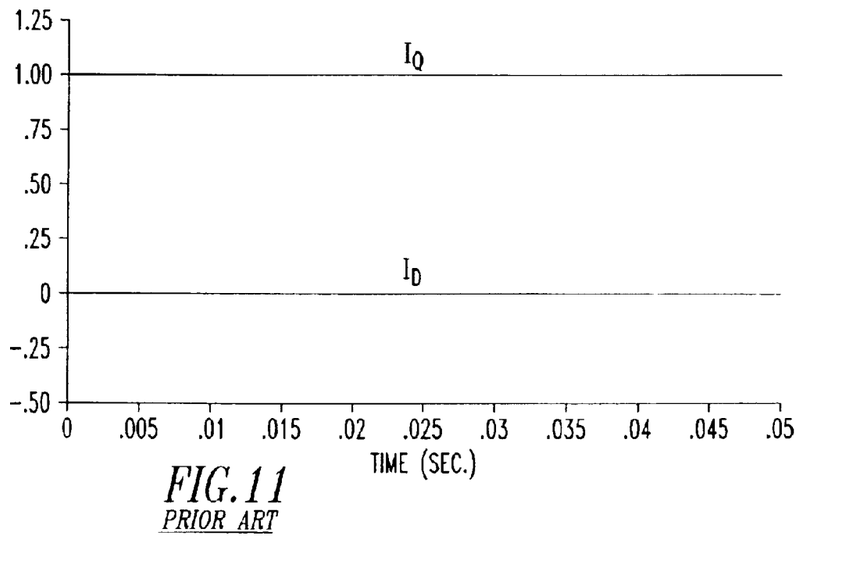
FIG. 11 is a plot of the two Park Transform output current signals versus time.

The projected two-phase current vectors, $I_d, I_q$, in the axes d,q, respectively, together with the angle θ as obtained from the space vector module 48 of FIG. 1 are fed into the Park Transform module 44 as shown in FIGS. 9–11. The Park Transform module 44 employs the Park Transform Equation (Equation 2).

$$\begin{cases} I_D = I_d\cos\theta + I_q\sin\theta \\ I_Q = I_d\sin\theta + I_q\cos\theta \end{cases} \quad \text{(Eq. 2)}$$

As a result, the stationary frame two-phase quantities $I_d$ and $I_q$ are transformed into rotating two-phase quantities $I_D$ and $I_Q$ on the rotating real axis D and the rotating imaginary axis Q, respectively. Thus, when viewed from the rotating reference frame D,Q, the current and voltage space vectors I,V become stationary. The real axis D of the rotating reference frame is located at the angle θ from the real axis d of the stationary reference frames. The angular velocity for θ is determined by the AFD commanded frequency, f, of FIG. 1 as input by the space vector module 48.

Figure 4:
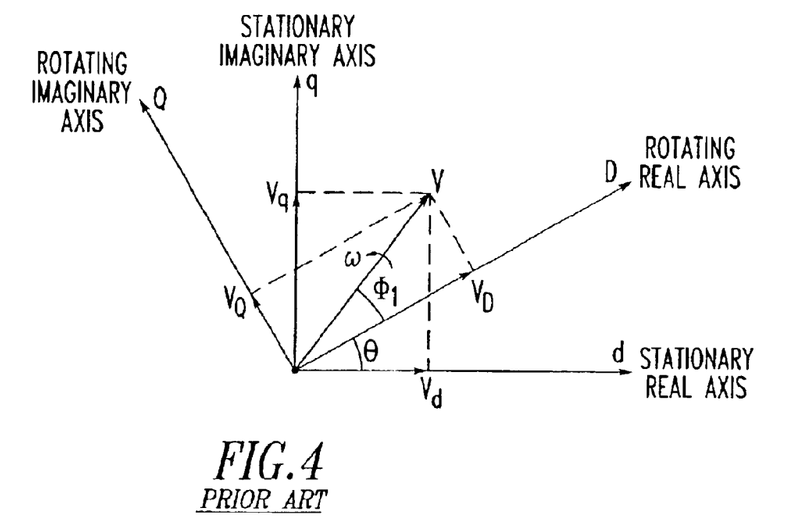
FIG. 4 is a vector diagram including a voltage space vector projection on rotating and stationary reference frames.
Figure 5:
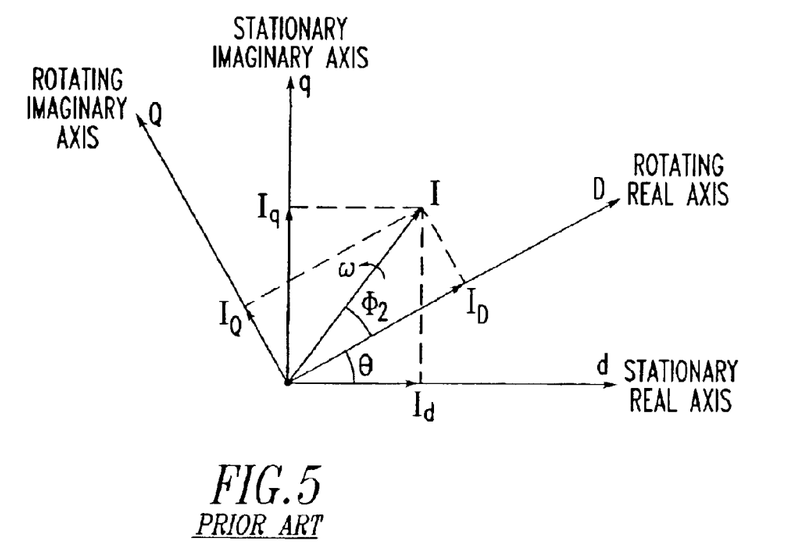
FIG. 5 is a vector diagram including a current space vector projection on rotating and stationary reference frames.

As shown in FIGS. 4 and 5, $\phi_1$ is the angle between the voltage space vector V and the D-axis, and $\phi_2$ is the angle between the current space vector I (as shown in FIGS. 1–3 and 5) and the D-axis. The angle relationship is $\phi=\phi_1-\phi_2$. In FIG. 2, the induction machine, such as the AC motor 6 of FIG. 1, is in the motoring mode when the voltage V leads the current I by φ. The load is inductive in this mode. In FIG. 3, the induction machine is in the generating mode with the voltage V lagging the current I by φ. The load behaves as a capacitive component. The angle φ may, thus, distinguish the induction machine motoring and generating modes of operation.

Figure 18:
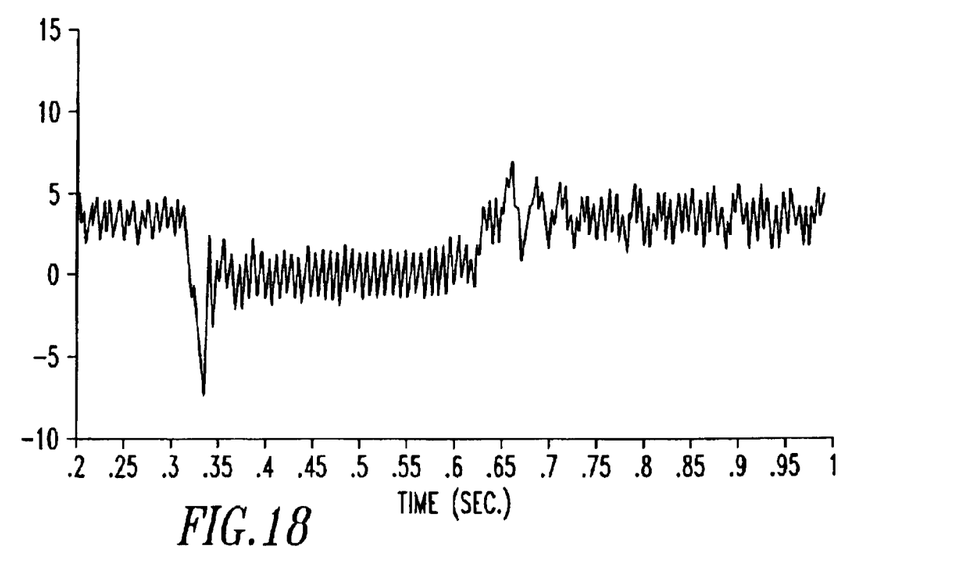
FIG. 18 is a sample plot of torque producing current versus time for the AFD system of FIG. 1.

Referring to FIGS. 3, 5 and 18, the torque producing current component $I_Q$ actually reverses its polarity (e.g., direction or sign) during the transition from the motoring mode to the generating mode of operation. This transition may be captured, for example, by the DSP 38 employing a suitably high sampling rate. This is the ultimate indication, under a relatively fast deceleration command, if the generating mode operation is in place. In the case of a relatively slower deceleration command, a combination of this method and the ability to detect the difference of the commanded speed and the actual induction machine speed may be employed.

Figure 14:
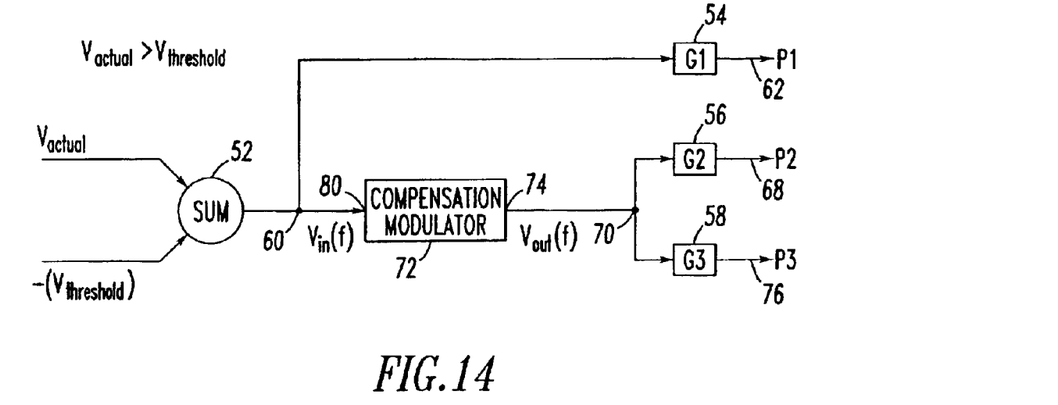
FIG. 14 is a block diagram of the Regeneration Override Logic Module of FIG. 1.

When the induction machine is in its normal motoring mode operation, the regenerating DC bus voltage threshold, $V_{threshold}$ of FIG. 14, moves up and down based on the three-phase AC voltages 24 of FIG. 1 from the AC power source (not shown). For example, the DC bus voltage, $V_{bus}$, is approximately 1.35 times the AC line input voltage. For a 480 VAC input, the DC bus voltage is about 670 VDC. For this condition, the regenerating DC bus voltage threshold is preset to about 730 VDC (e.g., about 60 VDC above the actual DC bus voltage). For a 500 VAC input, the DC bus voltage is about 700 VDC. Here, the regenerating DC bus voltage threshold is preset to about 760 VDC (e.g., about 60 VDC above the actual DC bus voltage). Preferably, the DC bus voltage threshold is determined from an average of a suitable count of samples (e.g., without limitation, 8–10 samples) of the DC bus voltage. Accordingly, the DC bus voltage is adjusted dynamically solely based on the AC line input without actually utilizing any input AC line voltage measurement apparatus. Although an example offset of about 60 VDC between the actual DC bus voltage and the regenerating voltage threshold is disclosed, any suitable positive offset may be employed.

Once the regenerating mode is detected, the real time regeneration override logic module 46 of FIG. 1 initiates a series of algorithm commands (as discussed below in connection with FIG. 14), in order to provide regenerating energy flow control. The regeneration override logic module 46 allows the AFD 4 to accelerate and decelerate without a high DC bus voltage trip. For example, for a 4-pole, 3-phase, 460 VAC, 60 Hz induction machine, the performance may include: (1) acceleration/deceleration from/to 1800 rpm unloaded at a rate of 60 Hz/s (1 s time) at an input voltage of 480 VAC; (2) acceleration/deceleration from/to 1800 rpm unloaded at a rate of 120 Hz/s (0.5 s time) at an input voltage of 480 VAC; (3) acceleration/deceleration from/to 1800 rpm unloaded at a rate of 600 Hz/s (0.1 s time) at an input voltage of 480 VAC; (4) acceleration/deceleration from/to 1800 rpm unloaded at a rate of 60 Hz/s (1 s time) at an input voltage of 504 VAC; (5) acceleration/deceleration from/to 1800 rpm unloaded at a rate of 120 Hz/s (0.5 s time) at an input voltage of 504 VAC; and (6) acceleration/deceleration from/to 1800 rpm unloaded at a rate of 600 Hz/s (0.1 s time) at an input voltage of 504 VAC.

Figure 17:
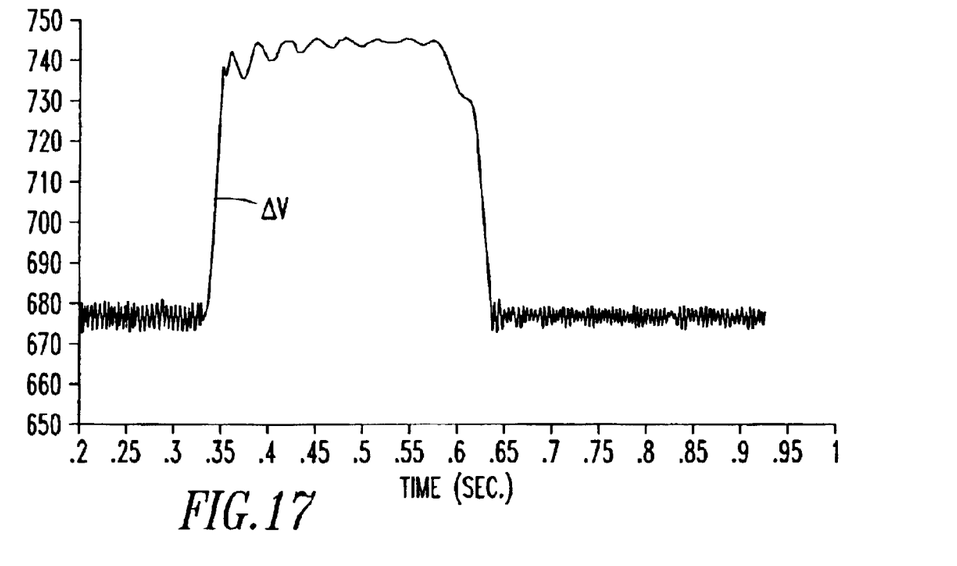
FIG. 17 is a sample plot of AFD DC bus voltage versus time for the AFD system of FIG. 1.
Figure 19:
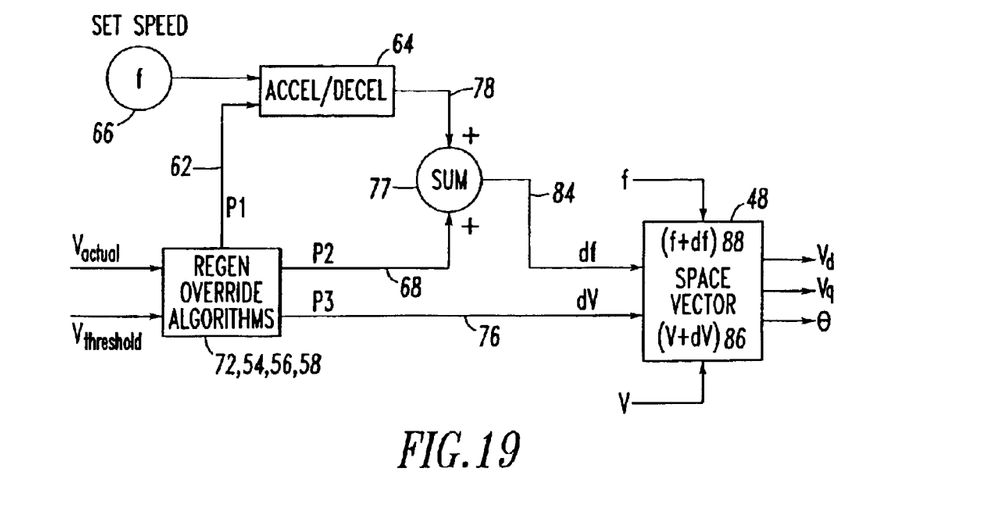
FIG. 19 is a block diagram showing the application of the three outputs of the Regeneration Override Logic algorithms of FIG. 14.

In the regeneration override logic module 46 of FIG. 14, the difference between the sampled DC bus voltage, $V_{actual}$, and the predetermined voltage threshold, $V_{threshold}$, is determined by a summing function (SUM) 52, which inputs the negative predetermined voltage threshold. If the sampled DC bus voltage is below the predetermined voltage threshold, then the regeneration override logic is inactive. However, as soon as the threshold is reached, there are active algorithm paths through three algorithms 54,56,58 to control the regenerative energy flow. The first algorithm 54 applies a proportional regulator gain G1 to the voltage difference 60, which is output by the summing function 52. As shown in FIG. 19, the resulting quantity P1 62 is applied to acceleration/deceleration logic 64. The motor set speed 66 is set by the frequency input f of FIG. 1. The f°requency input f goes through the acceleration/deceleration logic 64, in order to ramp up or ramp down the motor 6 at a preset acceleration or deceleration rate. In the motoring mode, the quantity P1 62 is zero. In the regenerating mode, the quantity P2 68 represents the additional amount of frequency command to be added to the original set frequency f (which is determined externally to the DSP 38 by the user through a communication link (not shown) between the DSP 38 and another microcontroller (not shown)), in order to ramp up or ramp down the frequency at a predetermined rate. For example, the proportional gain G1 may be based upon the six performance items of the preceding paragraph. In this example, if the proportional gain G1 is suitably set together with gains G2 and G3, then the DC bus voltage, $V_{bus}$, is clamped as shown in FIG. 17 under the test conditions of the six performance items. Otherwise, if the gain G1 is not suitably set, then the DC bus voltage, $V_{bus}$, may lose control, thereby tripping the AFD 4.

Figure 20A:
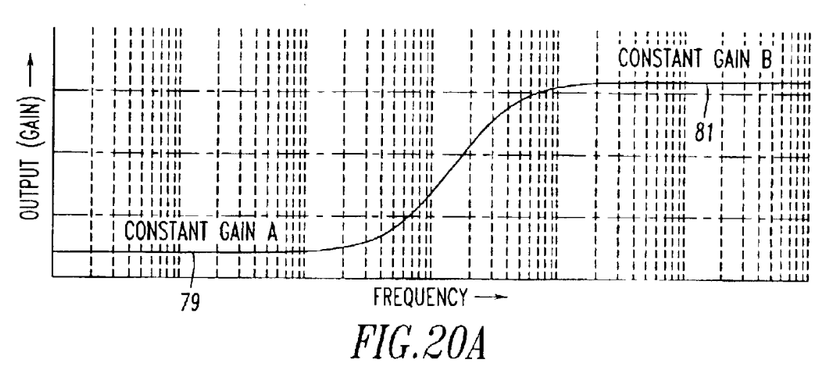
FIG. 20A is a plot of the amplitude of the output to input signal gain of the compensation modulator of FIG. 14 versus frequency.
Figure 20B:
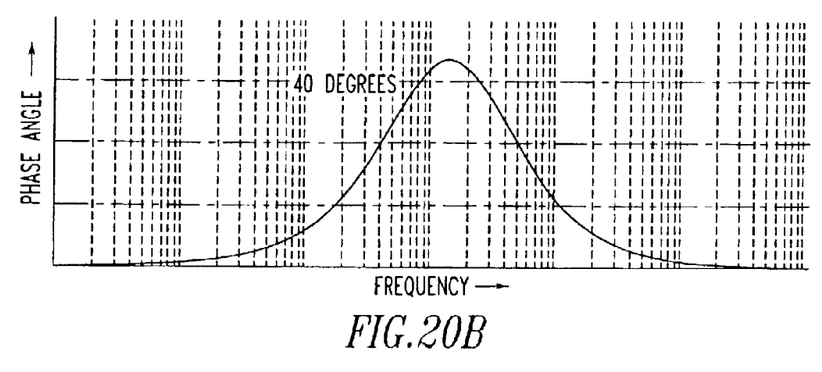
FIG. 20B is a plot of the phase angle between the output and input signals of the compensation modulator of FIG. 14 versus frequency.

As shown in FIG. 14, a compensated voltage difference 70 to the second and third algorithms 56,58 is the positive voltage difference 60 as compensated by the compensation modulator 72. The output 74 of the compensation modulator 72 feeds into the gains G2 and G3 of the respective algorithms 56 and 58. The quantities P2 68 and P3 76 are both zero if the motoring mode is active. In the generating mode, the quantity P2 68 is another additional amount of frequency, which summing function 77 adds to the frequency output 78 of the acceleration/deceleration logic 64. The quantity P3 76 represents the additional amount of voltage (dV) to be added to the motor 6. At relatively very low frequencies, the amplitude of the compensation modulator output quantities P2 68 and P3 76, with P3 being about several times larger than P2, is nearly a constant value, with the voltage difference 60 at the compensation modulator input 80 being provided with a constant gain A 79 (as shown in FIG. 20A) by the compensation modulator 72. The phase angle of the compensated voltage difference 70 of the compensation modulator output 74, is nearly the same as the phase angle of the voltage difference 60 at the input 80 of the compensation modulator 72. At intermediate frequencies, the amplitude of the compensated voltage difference 70 increases nonlinearly with frequency for a given input amplitude as shown in FIG. 20A. As shown in FIG. 20B, the phase angle of the compensated voltage difference 7⊙ 0 has a bell shape and, as a result, the phase angle of the compensated voltage difference 70 leads the phase angle of the voltage difference 60 by more than about 40 degrees at the peak of the bell shaped curve. At relatively very high frequencies, the amplitude of the compensated voltage difference 70 is nearly a constant value, with the voltage difference 60 at the compensation modulator input 80 being provided with a new constant gain B 81. The phase angle of the compensated voltage difference 70 is nearly the same as the phase angle of the voltage difference 60. The transition from the low frequency control characteristics to the high frequency control characteristics is done automatically, as shown in FIGS. 20A and 20B, without using any switching apparatus.

As employed in FIGS. 14 and 20A, the signal at input 80 is denoted as $V_{in}(f)$, and the signal at output 74 is denoted as $V_{out}(f)$, with $V_{in}(f)$ and $V_{out}(f)$ changing with f (frequency). The value of the plot in FIG. 20A is 20 log $(V_{out}(f)/V_{in}(f))$. If $V_{in}(f)$ and the curve are known, then $V_{out}(f)$ can be determined by the previous expression.

The second algorithm 56 applies a proportional gain term G2 to the compensated voltage difference 70. As shown in FIG. 19, the quantity P2 68 is summed with the frequency output 78 of the acceleration/deceleration logic 64, while bypassing such logic 64 for faster system response.

The third algorithm 58 provides the quantity P3 76 by applying a proportional gain term G3 to the compensated voltage difference 70. This third algorithm 58 increases the induction machine applied voltage during the regenerating mode in transient conditions. In the case of both low and high frequency controls (i.e., the compensation modulator behaviors, as discussed above, when the voltage difference 60 varies from relatively low, to intermediate, to relatively high frequencies) on the AFD system 2 of FIG. 1, if the voltage difference 60 is negative, then the induction machine 6 is in the motoring mode and all three algorithms 54,56,58 of the regeneration override logic module 46 of FIG. 1 are disabled.

A space vector generation function (not shown) of the space vector module 48 adjusts the voltage input V and the frequency input f of FIG. 1 by the quantity P3 76 (dV) and the quantity 84 (df), respectively, in order to provide internal values ((V+dV) 86 and (f+df) 88) for the space vector module 48. In turn, the space vector module 48 provides the outputs ($V_d$, $V_q$, $\theta$).

Figure 12:
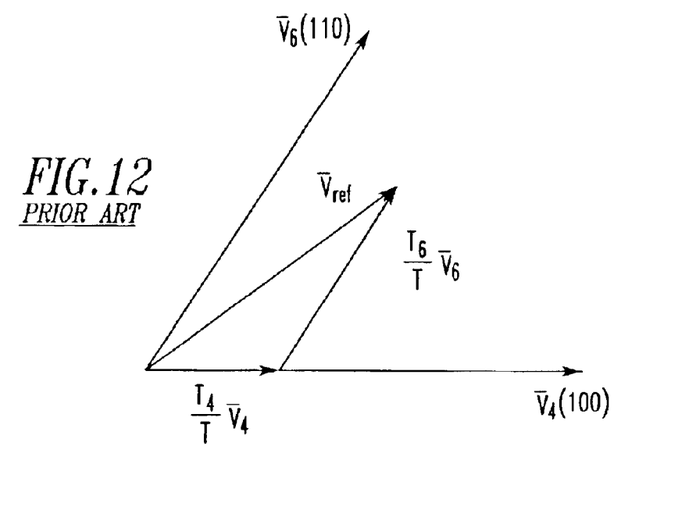
FIG. 12 is a vector diagram defining a space vector.

Referring again to FIG. 1, the incremental voltage, dV, and the commanded frequency modification, df, are determined in the regeneration override logic module 46. The incremental voltage, dV, is a voltage variation, which is added to the original induction machine commanded voltage, V. The commanded frequency modification, df, is a frequency variation, which is added to the original AFD commanded frequency, f. The resulting voltage space vector in FIG. 12 is $V_{ref}$, which rotates counterclockwise at an angular velocity determined by the frequency f+df. This rotating voltage vector (i.e., as defined by $V_d$, $V_q$, $\theta$) is fed into the space vector PWM module 50 of FIG. 1, which, in turn, outputs six (i.e., 3 gate signals and three complemented gate signals) gate signals for the interface 40 to the six IGBTs 26,28,30,32,34,36 of the inverter 12.

The space vector PWM module 50 employs digital computations for AFD applications and calculates the IGBT switching times of the inverter 12. This provides a 15% increase in DC bus voltage utilization compared with the conventional Sine-Triangle technique and reduces harmonic contents at relatively high modulation indices compared with such Sine-Triangle technique.

Figure 13:
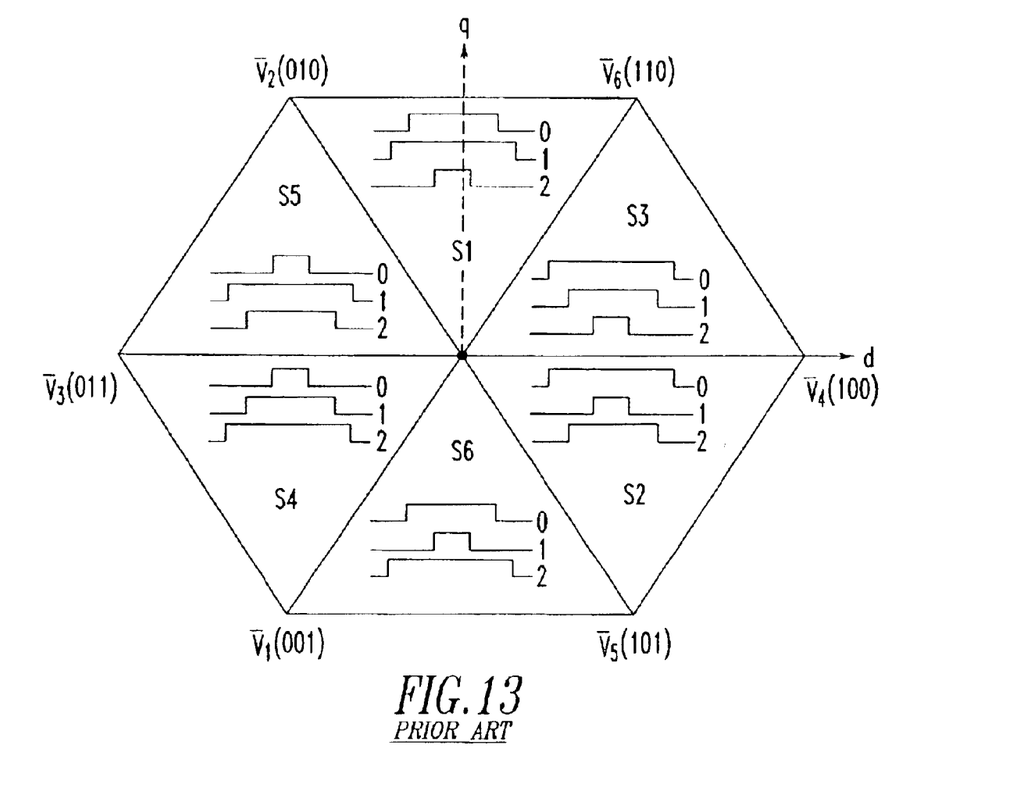
FIG. 13 is a diagram showing IGBT gating in six different active states or 60° sectors for the space vector PWM module of FIG. 1.

As shown in FIG. 13, there are eight inverter states including six active states: S1–S6, and two zero states: S0 and S7 (not shown). The six active states S1–S6 occur when either: (a) one upper (e.g., one of IGBTs 26,30,34) and two lower (e.g., two of IGBTs 28,32,36) inverter IGBTs; or (b) two upper and one lower inverter IGBTs conduct simultaneously. The two zero states occur when either: (a) the three upper inverter IGBTs; or (b) the three lower inverter IGBTs are turned on. These two zero states are often referred to as freewheeling states, since all motor currents are freewheeling during operation in these configurations. There are six 60° sectors (as shown by the states S1–S6 of FIG. 13) and, in each sector, a particular switching pattern is provided (where "0" corresponds to IGBT 26, "1" corresponds to IGBT 30, and "2" corresponds to IGBT 34 as shown in FIG. 13). The switching times are calculated at up to about a 20 kHz rate and the PWM voltages are applied to the induction machine 6. In order to close the loop, the resulting output currents (e.g., $I_a$, $I_b$, $I_c$ of FIG. 1) are sensed by the current sensors 14,16,18 and fed into the Clarke Transform module 42 of FIG. 1 for processing.

Figure 15:
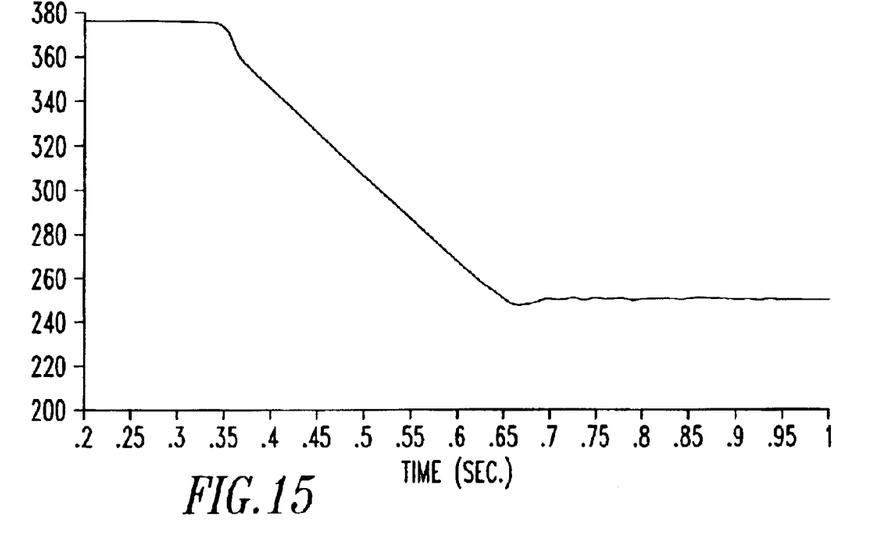
FIG. 15 is a sample plot of induction machine speed versus time for the AC motor of FIG. 1.

FIGS. 15–18 show various sample AFD system performances in accordance with the present invention. For example, the AFD system 2 may be operated on a 3-phase, 15 HP, 460V, 60 Hz, 4-pole induction machine, such as AC motor 6. In FIG. 15, the motor 6 initially operates at about 377 rad/s (i.e., 60 Hz excitation frequency). After about 0.35 s, a speed command, f, of 40 Hz is issued and the motor speed is set to decelerate at a rate of −120 Hz/s. In turn, the regenerating mode takes place (i.e., between about 0.35 s and about 0.65 s) as best shown in FIG. 17.

Figure 16:
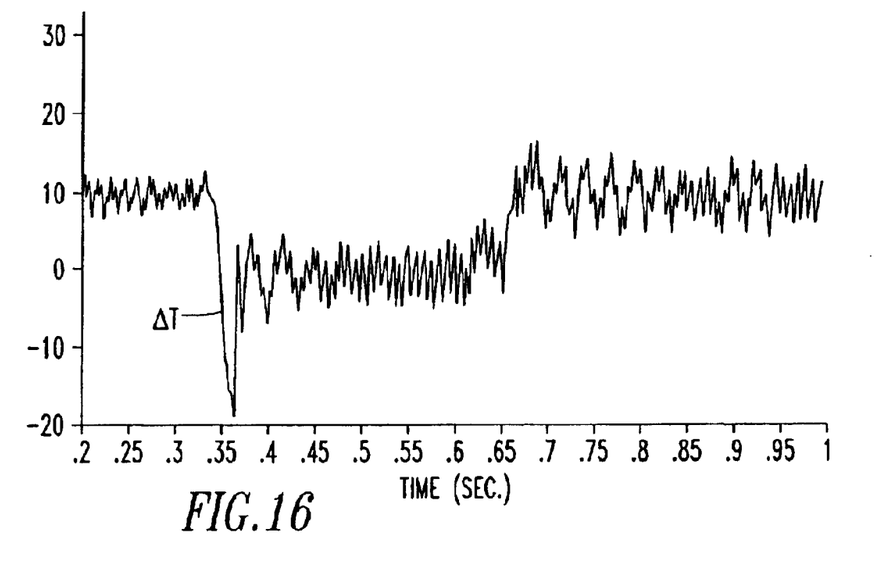
FIG. 16 is a sample plot of induction machine torque versus time for the AC motor of FIG. 1.

FIG. 16 shows the induction machine torque response. Because of the presence of negative slip, the torque changes abruptly (at ΔT) from 10 Nm to nearly −20 Nm. Also, at this point in FIG. 17, the DC bus voltage, $V_{bus}$, transitions (at ΔV) from the nominal 680 V to a level of 740 V. 740V is the predetermined voltage threshold, $V_{threshold}$, for the regeneration override logic module 46. The DC bus voltage, $V_{bus}$, is clamped at the 740 V level for as long as the regenerating condition exists.

FIG. 18 shows an important aspect of the invention for detecting the regenerating mode of operation. In this example, the torque producing current component, $I_Q$, switches from about +4 A to about −7 A when the regenerating mode of the induction machine 6 initiates. If the regenerating condition is not true, then the predetermined threshold, $V_{threshold}$, adjusts itself (e.g., about 60 VDC above the actual DC bus voltage) based upon the level of the DC bus voltage, $V_{bus}$, as determined by the three-phase AC voltages 24. In other words, the 740 V voltage threshold changes as the three-phase AC voltages vary.

In addition, the amplitude of the current I 94 of FIG. 1 is shown in Equation 3, which reflects the peak amplitude of the measured three-phase currents (e.g., $I_a$, $I_b$, $I_c$ of FIG. 1).

$$I=\sqrt{I_D^2+I_Q^2} \qquad (Eq.\ 3)$$

The load power factor, cos φ, may readily be calculated from Equation 4, wherein φ is the power factor angle.

$$\cos\phi = I_Q/I \qquad (Eq.\ 4)$$

It will be appreciated that while reference has been made to the exemplary DSP 38, a wide range of other suitable processors such as, for example, mainframe computers, mini-computers, workstations, personal computers (PCs), microprocessors, microcomputers, and other microprocessor-based computers may be employed using internal and/or external A/D converters.

It will be appreciated that while reference has been made to the exemplary Space Vector PWM module 50, other suitable PWMs, such as, for example, a Sine-Triangle PWM, may be employed.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

What is claimed is:

1. A method for dynamically controlling induction machine regenerating energy flow and direct current bus voltage for an adjustable frequency drive system comprising a direct current bus and an inverter inputting the direct current bus, said inverter including a plurality of control inputs and a plurality of alternating current outputs, said method comprising:

sensing a direct current voltage of said direct current bus;
sensing a plurality of alternating currents at the alternating current outputs of said inverter;
transforming said sensed alternating currents to a stationary current vector;

converting a voltage value and a frequency value to a stationary voltage vector and an angle;

transforming the angle and said stationary current vector to a rotating current vector including a torque producing current component and a flux producing current component;

determining a generating mode of said induction machine when said torque producing current component reverses polarity;

employing the voltage value and the frequency value to limit the direct current voltage of said direct current bus at a predetermined threshold responsive to said generating mode of said induction machine;

determining a voltage difference between the direct current voltage of said direct current bus and the predetermined threshold;

employing a compensation modulator to compensate the voltage difference and provide a compensated voltage difference;

applying the voltage difference to a first algorithm having a first gain and a first output quantity in the generating mode;

applying the compensated voltage difference to second and third algorithms having second and third gains and second and third output quantities, respectively, in the generating mode;

providing an intermediate frequency from a set frequency and the first output quantity;

adding the second output quantity to the intermediate frequency to provide a change frequency value;

employing the third output quantity as a change voltage value;

calculating the voltage value as the sum of a set voltage value and the change voltage value, and calculating the frequency value as the sum of a set frequency value and the chance frequency value; and converting the stationary voltage vector and the angle to pulse width modulated control signals for the control inputs of said inverter.

2. The method of claim 1 further comprising:
employing said direct current bus having a nominal voltage; and
determining when said induction machine is no longer in the generating mode, and responsively resetting the direct current voltage of said direct current bus to said nominal voltage.

3. The method of claim 1 further comprising:
adjusting the predetermined threshold as a function of the direct current voltage of said direct current bus.

4. The method of claim 3 further comprising:
calculating the predetermined threshold as the direct current voltage of said direct current bus plus a predetermined voltage.

5. The method of claim 4 further comprising:
employing +60 VDC as said predetermined voltage.

6. The method of claim 1 further comprising:
determining a motoring mode when the generating mode of said induction machine is not active, and responsively setting the second and third output quantities to zero.

7. The method of claim 1 further comprising:
employing a first range of frequencies of said alternating currents;
employing a second range of frequencies of said alternating currents, said second range being greater than said first range;
employing a third range of frequencies of said alternating currents, said third range being greater than said second range;
employing the voltage difference for the first range of frequencies to provide the compensated voltage difference, which is output with a first constant gain;
nonlinearly increasing amplitude of the compensated voltage difference with frequency of said alternating currents; and
employing the voltage difference for the third range of frequencies to provide the compensated voltage difference, which is output with a second constant gain, which is greater than the first constant gain.

8. The method of claim 7 further comprising:
employing the voltage difference and the compensated voltage difference having about equal phase angles for said first range of frequencies;
employing the voltage difference and the compensated voltage difference having about equal phase angles for said third range of frequencies;
employing a first phase angle of the compensated voltage difference for the second range of frequencies; and
employing a second phase angle of the voltage difference for the second range of frequencies, with said first phase angle leading the second phase angle by more than about 40 degrees.

9. The method of claim 1 further comprising:
employing the torque producing current vector and the flux producing current vector to calculate power factor of said induction machine.

10. An adjustable frequency drive system comprising:
a three-phase induction machine; and
an adjustable frequency drive comprising:
a converter including a plurality of alternating current inputs and a direct current output having a first node and a second node;
a capacitor electrically connected between the first and second nodes of said direct current output;
an inverter including a direct current input, a plurality of switches, a plurality of control inputs, and a plurality of alternating current outputs, said direct current input electrically connected to said direct current output, said alternating current outputs adapted to electrically connect to said alternating current inputs of said induction machine; each of said switches electrically connected between one of the first and second nodes and one of the alternating current outputs of said inverter, each of said control inputs controlling one of said switches;
a voltage sensor sensing a direct current voltage at the direct current output of said converter and outputting a sensed voltage value;
a plurality of current sensors sensing a plurality of alternating currents at the alternating current outputs of said inverter and outputting a plurality of sensed current values; and
a processor comprising:
a plurality of inputs for said sensed current values and said sensed voltage value,
a plurality of outputs for the control inputs of said inverter,
a Clarke Transform module transforming said sensed current values to a stationary current vector,
a space vector module including a plurality of inputs and a plurality of outputs, the inputs of said space vector module comprising a set voltage value, a set frequency value, a change voltage value, and a change frequency value, the outputs of said space vector module comprising a stationary voltage vector and an angle, a pulse width modulation (PWM) module including a plurality of inputs and a plurality of outputs, the inputs of said PWM module comprising the stationary voltage vector and the angle, the outputs of said pulse width modulation module providing the control inputs of said inverter, a Park Transform module transforming the angle and said stationary current vector to a rotating current vector, and a regeneration override module comprising a plurality of inputs and a plurality of outputs, the inputs of said regeneration override module comprising the sensed voltage value and said rotating current vector, the outputs of said regeneration override module comprising the change voltage value and the change frequency value, said regeneration override module dynamically controlling regenerating energy flow from the induction machine to the direct current output of said converter, wherein said regeneration override module includes means for determining a voltage difference between the sensed voltage value and a predetermined threshold, means for compensating the voltage difference and providing a compensated voltage difference, means for providing a first output quantity in the generating mode from the voltage difference and a first gain, means for providing a second output quantity in the generating mode from the compensated voltage difference and a second gain, and means for providing a third output quantity in the generating mode from the compensated voltage difference and a third gain.

11. The adjustable frequency drive system of claim 10 wherein said regeneration override module further includes means for providing an intermediate frequency from the set frequency value and the first output quantity, and means for adding the second output quantity to the intermediate frequency to provide the change frequency value; and wherein said third output quantity is the change voltage value.

12. The adjustable frequency drive system of claim 10 wherein said predetermined threshold is the sensed voltage value plus a predetermined voltage.

* * * * *